United States Patent [19]

Phillips

[11] 4,253,746
[45] Mar. 3, 1981

[54] PROCESS FOR FORMING A MULTIFOCAL LENS AND LENS FORMED THEREBY

[76] Inventor: Edward H. Phillips, 30 King George Rd., Warren, N.J. 07060

[21] Appl. No.: 6,257

[22] Filed: Jan. 24, 1979

[51] Int. Cl.³ .................. C03B 11/08; C03B 23/22; G02C 7/06
[52] U.S. Cl. ................................ 351/168; 65/37; 351/177
[58] Field of Search .................. 351/168, 170–172, 351/177; 65/37

[56] References Cited

U.S. PATENT DOCUMENTS

| | | | |
|---|---|---|---|
| 1,360,727 | 11/1920 | Cross | 351/171 X |
| 3,577,690 | 5/1971 | Catron | 351/177 X |

*Primary Examiner*—Conrad J. Clark
*Assistant Examiner*—Scott J. Sugarman
*Attorney, Agent, or Firm*—Shoemaker and Mattare, Ltd.

[57] ABSTRACT

A multifocal lens is formed by positioning ground and polished elongate lens portions together with the longitudinal edges thereof abutting each other, and fusing the abutting edges together.

17 Claims, 13 Drawing Figures

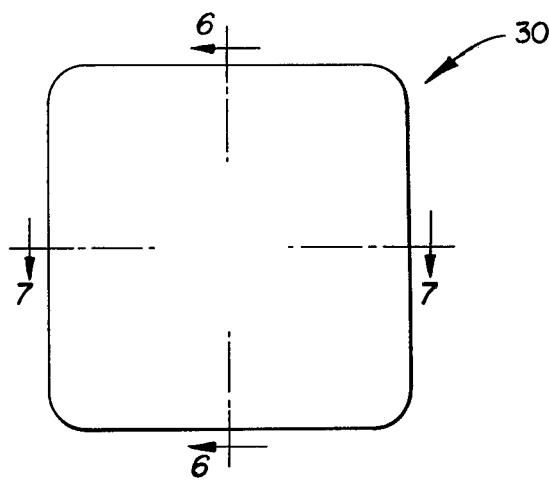
FIG. 5.
FIG. 7.
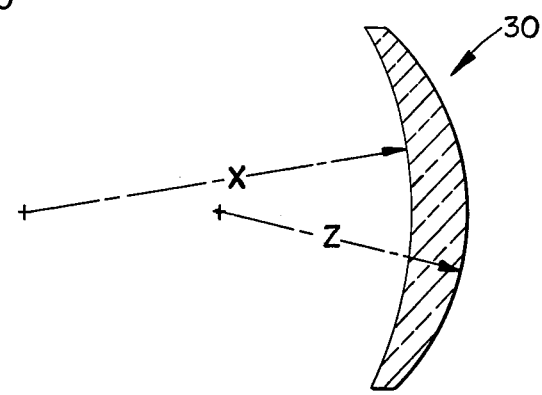
FIG. 6.
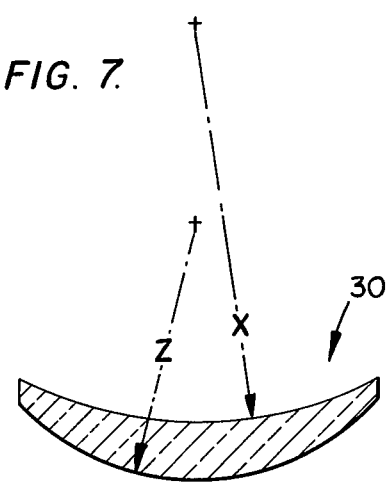
FIG. 8.
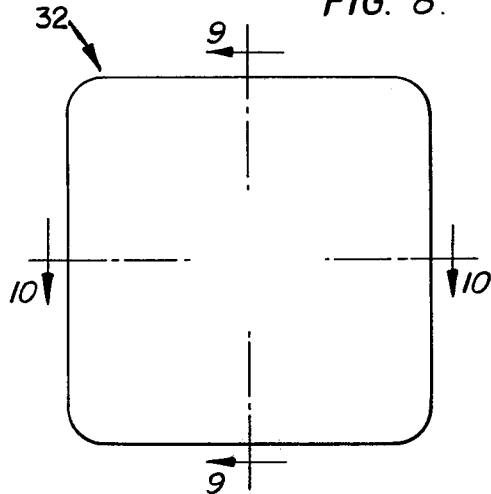
FIG. 9.
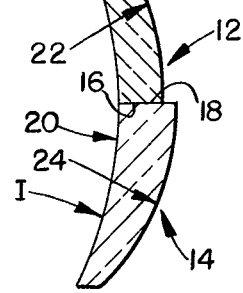
FIG. 11.
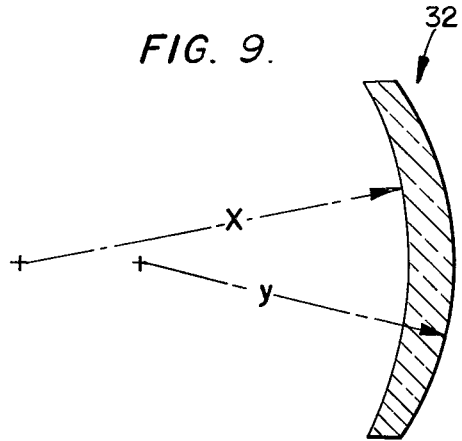
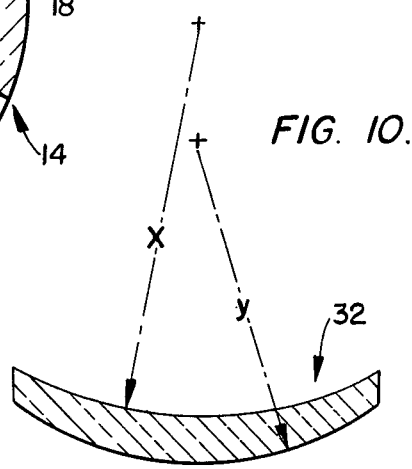
FIG. 10.

PROCESS FOR FORMING A MULTIFOCAL LENS AND LENS FORMED THEREBY

BACKGROUND OF THE INVENTION

The present invention relates in general to multifocal lenses, and, more particularly, to a method of manufacturing a multifocal lens.

Known multifocal lenses are subject to many drawbacks, such as glare, reflection off internal surfaces, small field of vision, and the like.

A process for forming known multifocal lenses includes removing a piece of a single lens and replacing that removed piece with another lens portion. Such methods are disclosed in U.S. Pat. Nos. 3,915,723, 1,996,442, 1,373,633, 3,649,236, 3,563,057, 2,963,823 and 2,254,440. The replaced lens portion is formed of a material different from that of a single lens. This type of lens has many drawbacks, the principal ones being internal reflection and glare. Furthermore, the field of vision through the inserted piece is reduced from that field of vision otherwise available.

In another form of bifocal lens, i.e., the "Executive" type, the near vision section is ground on the same piece of glass as the distance vision part. Disadvantages of this type of lens are:

1. The difficulty of making a sharp step in the line of separation between two lens sections further creates the following disadvantages:
   a. highly specialized equipment is required to manufacture such lenses;
   b. the manufacturing cost is thus relatively high; and
   c. step between two sections is not sharp.
2. When a near vision lens portion is ground on the bottom half of the distance vision lens portion, the top of the near vision portion will be a little below the top surface of the distance vision portion at the center, and since the near vision lens portion has the greater degree of curvature, that lens portion will be considerably below the far vision surface at the outer edges of the bifocal lens. In order to leave these edges (on the near vision section) at a practical thickness, the entire lens must be made relatively thick and heavy.

Much precise grinding and polishing is required to finish known multifocal lenses, and accordingly, the manufacturing process is quite difficult and expensive.

SUMMARY OF THE INVENTION

The process and lens embodying the teachings of the present invention are free of the drawbacks inherent in the processes and lenses of the prior art.

A bifocal lens embodying the teachings of the present invention is comprised of a pair of elongate lens halves, each of which has been appropriately ground to correct either distance or near vision. The lens halves are edge ground so the longitudinal edges thereof are essentially flat and each half can be flushly edge abutted with other halves. The lens halves are matched so a bifocal lens can be formed, placed in edge abutting relationship with the longitudinal side edges of the matched lens halves flushly abutting each other, and back ground to form a smooth curve on the inside of the bifocal lens. The edge abutting lens halves are placed on a fusing jig and heated to a temperature sufficient to cause the abutting lens halves to fuse together at the abutting longitudinal edges. After an appropriate time, the temperature is dropped and the bifocal lens is annealed. The lens is then a finished lens which is produced without need of further polishing or grinding.

The bifocal lens thus formed has a field of vision through the bottom half which is equal to that through the top half thereof. Furthermore, the lens halves can be positioned prior to fusing in a manner which most efficiently accommodates any step change in surface on the outside of the lens caused by the different radii of curvature of the two lens halves. The efficient accommodation of a step change in surface permits formation of light, thin multifocal lenses which have any noticeable line between lens portions minimized.

Both halves of the presently disclosed bifocal lens can be formed of the same material, and thus manufacturing costs can be reduced.

The edge fused bifocal lens formed according to the teachings of the present invention has little or no internal reflection or glare and is thus quite comfortable for a wearer.

While the present disclosure will be directed to a bifocal lens, it is to be understood that other multifocal lenses, such as trifocals, or the like, can be formed according to the same process without departing from the scope of the present invention. The disclosure of a bifocal lens is merely for the sake of convenience, and is not intended to be limiting.

OBJECTS OF THE INVENTION

It is, therefore, a main object of the present invention to form a multifocal lens by edge fusing lens portions together.

It is another object of the present invention to form a multifocal lens wherein all of the lens portions are formed of the same type of material.

It is yet another object of the present invention to form a multifocal lens wherein the field of vision through each portion thereof is equal to that through other portions thereof.

It is still another object of the present invention to form a multifocal lens wherein a step change between lens portions is equally distributed over the length of the lens.

These together with other objects and advantages which will become subsequently apparent reside in the details of construction and operation as more fully hereinafter described and claimed, reference being had to the accompanying drawings forming part hereof, wherein like reference numerals refer to like parts throughout.

BRIEF DESCRIPTION OF THE DRAWINGS

FIG. 5 is a plan view of a lens block used in forming a lens according to the teachings of the present invention.

FIG. 6 is a view along line 6—6 of FIG. 5.

FIG. 7 is a view along line 7—7 of FIG. 5.

FIG. 8 is a plan view of another lens block used in forming a lens according to the teachings of the present invention.

FIG. 9 is a view along line 9—9 of FIG. 8.

FIG. 10 is a view along line 10—10 of FIG. 8.

FIG. 11 is an elevation view of a finished bifocal lens formed according to the teachings of the present invention.

DETAILED DESCRIPTION OF THE INVENTION

Figure 1:
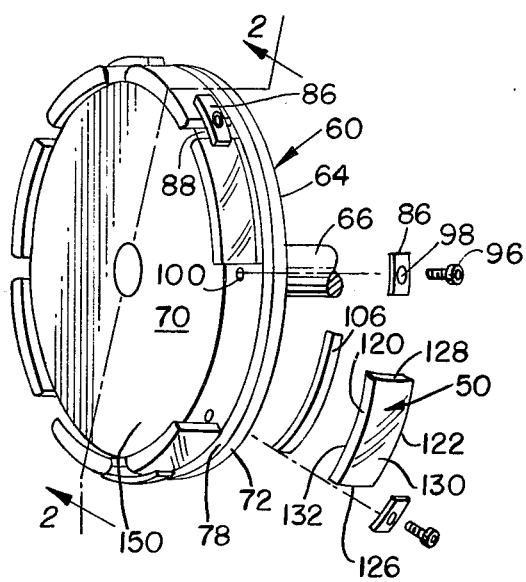
FIG. 1 is an exploded perspective view of a grinding jig used in forming a lens according to the teachings of the present invention.

A multifocal lens formed according to the process hereinafter described is shown in FIG. 11 and is denoted by the reference numeral 10. The lens shown in FIG. 11 is a bifocal lens, but the process embodying the teachings of the present invention can be used to form other types of multifocal lenses as well. The bifocal lens 10 includes a top portion 12 suitably ground and polished for facilitating distance vision, and a bottom portion 14 suitably ground and polished to facilitate close work, such as reading or the like. The two portions are edge fused together along abutting edges 16 and 18 and both have a common inside radius 20 and individual outside radii 22 and 24, respectively. The two portions are formed in the same type of glass, and are edge fused together according to the process described below. Each of the portions 12 and 14 of the lens 10 is formed from a blank or block of lens glass, such as blanks 30 and 32 shown in FIGS. 5 and 8, respectively. The blocks 30 and 32 are ground and polished to the proper radii of curvature as indicated in FIGS. 6, 7 and 9,10 where the radius X in all figures corresponds to radius 20, and the radius Z in FIGS. 6 and 7 correspond to the radius 22 in FIG. 11, and the radius Y in FIGS. 9 and 10 corresponds to the radius 24 in FIG. 11. The lens will be described again below, and is described here for the sake of convenience.

The preferred equipment used to form the lens 10 is shown in FIGS. 1-4, and attention is directed thereto. The lens blanks or blocks 30 and 32 are each cut into two halves, and these lens halves are indicated in FIGS. 1-4 by the reference numeral 50. As shown in FIG. 1, the lens halves 50 are all mounted on a grinding jig 60. The grinding jig is circular and includes a base 64 mounted onto a drive shaft 66 as by arboring or the like. The jig includes a central boss 70 located radially inward of the outer peripheral edge 72 of the base to define a mounting ledge 78 circumferentially disposed about the base 64. A plurality of elongate arcuate lens retainers 86 are attached to the central boss peripheral edge 88 by fasteners, such as cap screws 96, each inserted through a fastener accommodating hole 98 and threadably engaging a fastener receiving hole 100 defined in the boss edge 88 and aligned with the hole 98. A plurality of arcuate spacers 106 are mounted on the ledge 78 to support the lens halves thereon.

As shown in FIG. 1, the lens halves are mounted on the jig 60 to encircle same, and are all held on the spacers 106 and in position against the boss by the retainers 86. As shown in FIG. 1, each of the lens halves has a pair of side edges 120 and 122, and a pair of end edges 126 and 128, and an outside surface 130 and an inside surface 132. The lenses are mounted on the jig 60 so that inside surfaces 132 engage the boss side 88 and one of the side edges, such as edge 120, extends above top surface 150 of the boss 70. The boss edge 88 can be slightly inwardly sloped as indicated in FIG. 2 to provide better support for the lens halves, if so desired.

Figure 2:
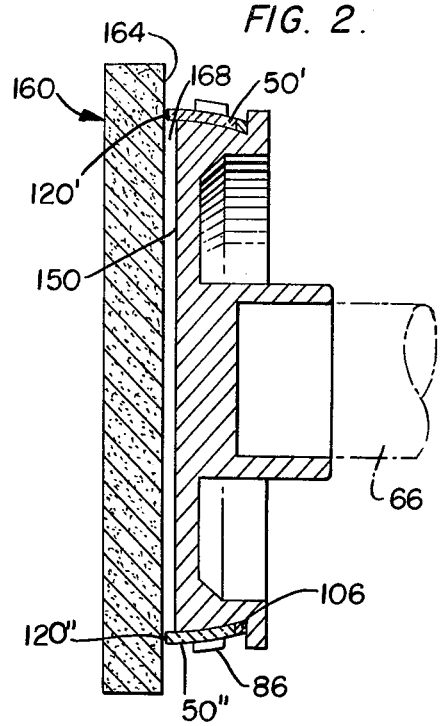
FIG. 2 is a view along line 2—2 of FIG. 1.

With the lens halves firmly mounted on the griding jig 60, a grinding wheel 160 having an abrasive surface 164 is brought to bear against the exposed lens half edges 120 as shown in FIG. 2. A gap 168 is defined between the surface 164 and top surface 150 of the jig to permit relative rotation of the grinding jig and grinding wheel.

The grinding process indicated in FIGS. 1 and 2 grinds the exposed lens half edges in a manner which makes all of those edges uniplanar, that is, edges 120' and 120" of the two lens halves 50' and 50" shown in FIG. 2 are each perfectly flat with respect to each other and in the same plane. The lens half edges 120' and 120" thus are coplanar as viewed from end 126 to end 128 and from face 130 to face 132. The importance of the uniplanar nature of all of the lens half edges will be discussed below.

After grinding edges 120, the lens halves are removed from the grinding jig 60, inverted to expose edges 122 to the grinding wheel, and the process indicated in FIG. 2 is repeated to grind the lens halves so that all of the edges 122 are also uniplanar.

The spacer blocks 106 and the ledge 150 are oriented and arranged so that once both edges 120 and 122 have been ground as above discussed, the edges 120 and 122 are essentially perfectly parallel with each other. The edges 120' and 120" are each essentially perfectly matched and substantially perfectly mateable with each other.

After completing the grinding process, a lens half 50' from the lens block 30 and a lens half 50" from the lens block 32 are selected and matched. The two halves 50' and 50" are placed in edge abutting relationship which is a flush relationship due to the perfect uniformity of the edges 120' and 120", and the inside radius of curvature is ground to form a flush and uniform inner surface I as indicated in FIG. 11.

Figure 3:
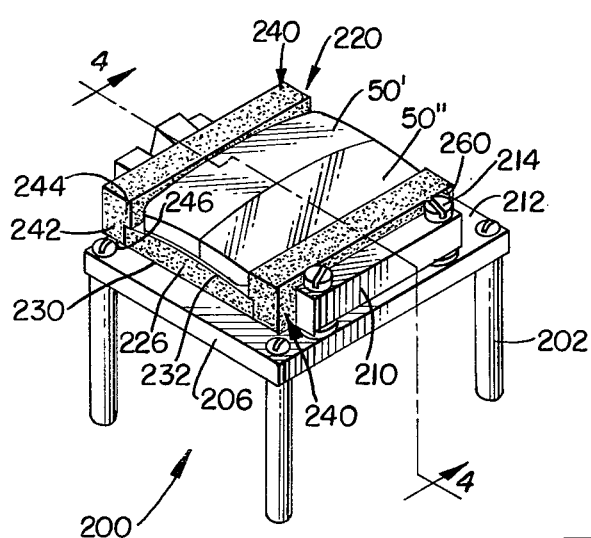
FIG. 3 is a perspective view of a fusing jig used in forming the lens according to the teachings of the present invention.
Figure 4:
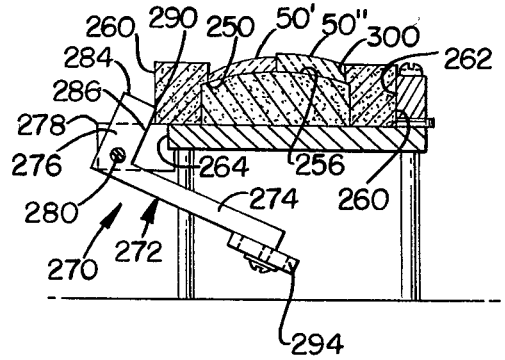
FIG. 4 is a view along line 4—4 of FIG. 3.

The edge abutting lens halves are then mounted on a fusing jig 200. The fusing jig 200 is best shown in FIGS. 3 and 4 and includes a plurality of legs 202 supporting a horizontal supporting pallet 206. A backstop 210 is attached to upper surface 212 of the pallet 206, as by cap screws 214, or the like.

A fusing cradle 220 rests on top surface 212 of the pallet, and includes a crested bolster block 226 having a planar bottom surface 230 and an arcuate top surface 232 which is breast-shaped to essentially match the curvature I of the inner surface of the lenses. A pair of gripping jaws 240 rest on the pallet on opposite sides of the bolster block. Each gripping jaw is L-shaped with a long leg 242 and a short leg 244. Bottom surface 246 of each gripping jaw rests on top surface 212 of the pallet so that the gripping jaw L shape is inverted. A shoulder 250 is formed at the juncture of the long and short legs and the upper surface 256 of the bolster block is received and accommodated by these shoulders. Each gripping jaw includes an outer back surface 260 which is presented outwardly of the fusing jig as indicated in FIG. 3. One of the gripping jaw back surfaces abuts inner surface 262 of the backstop, and the other back surface is located adjacent the edge 264 of the pallet which is remote from the backstop. As indicated in FIG. 4, the gripping jaw adjacent edge 264 can overhang that edge if so desired.

A clamp mechanism 270 is mounted on the fusing jig to retain the cradle in the assembled orientation shown in FIGS. 3 and 4 with the lens halves mounted thereon. The clamp mechanism includes an L-shaped swing arm 272 having a long leg 274 and a short leg 276 pivotally mounted on a bracket 278 by a pivot pin 280. The bracket 278 is affixed to the pallet 206 at edge 264 thereof. The short leg 276 has edges 284 and 286 which intersect to form a corner 290. The swing arm is mounted to pivot the corner 290 against the outer surface 260 of the gripping jaw located there adjacent, thereby forcing the cradle against the backstop, and the elements thereof together. A counterweight 294 is affixed to the end of the swing arm which is remote from the short leg thereof. The counterweight and the length of the long leg of the swing arm are selected so the clamp mechanism is selfadjusting to maintain substantially constant pressure on the cradle gripping jaws.

As best shown in FIG. 4, the gripping jaws have inner surfaces 300 abutting the outer edges of the lens halves mounted on the cradle. The pressure exerted on the gripping jaws by the clamp mechanism therefore is transmitted to the lens halves to maintain an essentially constant compressive pressure on the lens halves.

The self-adjusting feature of the clamp mechanism permits a combination of lens movement during the heating and cooling cycles to which those lens halves will be subject. In this manner, an essentially constant compressive pressure is held on the lens halves during the fusing process.

Other forms of fusing jig can be used without departing from the scope of the present invention, however, any jig so used should maintain compressive pressure on the lens halves tending to maintain the abutting edges further in contact during the fusing process, which pressure is essentially constant and accommodates lens movement during such fusing processes. In the preferred form, the fusing cradle is a ceramic material or aluminum oxide, or the like.

From the foregoing, the process of forming a multifocal lens can be described. The multifocal lens is formed by edge fusing a pair of lens halves. Thus, the process is as follows. Two lens blocks are each ground and polished. One lens block forms a distance correction and one block forms a near vision, or reading, correction. Each lens block is then cut in half. The edges of the lens halves are ground to be substantially flat, both transverse of the lens halves (that is, from the inner face to the outer face) and longitudinally of the lens half (that is, from one end edge to the other). The lens halves are turned over, and the other side edges are also ground to be substantially flat in both the transverse and longitudinal directions.

The edge ground lens halves are then matched, that is a distance correcting lens half is matched with a near vision correcting lens half, and placed in edge abutting relationship with each other. The substantially flat edges facilitate this flush edge abutment of the lens halves.

Figure 12:
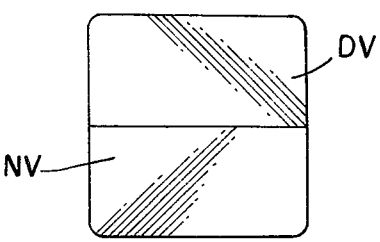
FIG. 12 is a plan view of a bifocal lens made in accordance with the teachings of the present invention.
Figure 13:
FIG. 13 is an end elevation of the lens shown in FIG. 12.

Matched, edge abutting lens halves are then back ground. That is, the inner surfaces of the lens halves, e.g., surface I of FIG. 11, are ground so the inner surfaces of the lens halves are perfectly flush and a smooth, uninterrupted curve is defined for surface I. The lens halves can be matched so the difference in curvature of the two halves is most efficiently handled. Thus, about one-half of the difference can be located at each end of the lens, thereby distributing the difference in curvature over the entire length of the lens and producing an overall lens in which a step change in surfaces due to differences in curvatures is distributed in the most advantageous manner. This matching is best shown in FIGS. 12 and 13 where the distance vision lens portion is indicated by the indicator DV, and the near vision lens portion is indicated by the indicator NV. It is seen in these two figures that the step between the distance viewing lens portion and the near viewing lens portion is arranged between the center of the bifocal lens and the edges thereof. This even distribution of a step change minimizes the line between sections noticeable to a wearer, and also makes it possible to make the lens thinner and lighter which is also an important advantage.

A bolster block of a fusing cradle is preferably coated with an anti-friction or anti-sticking agent, and the back ground, edge abutting lens has a place thereon. The cradle is supported on the fusing jig, and gripping jaws of the fusing cradle are clamped against the lens halves to hold those lens halves securely on the fusing cradle.

The cradle supported lens halves are placed into a heating means, such as a furnace, or the like, and enough heat is applied thereto to cause the abutting lens edges to fuse together to form a single, unitary bifocal lens. Just enough heat is applied to cause the abutting lens half edges to fuse together, as if too much heat is applied, the lens halves may run. Satisfactory results have been obtained when the edge abutting lens halves have been held at between about 1,360° and 1,400° F. for about six minutes for a lens thickness of about 5-½ millimeters.

Once the lens half edges are fused together, the temperature of the heating means is dropped, and the bifocal lens is annealed. Satisfactory results have been obtained when a drop in temperature of about 200° F. is instituted, and the bifocal lens held at this lower temperature for about four hours.

The fusing jig is then removed from the heating means, and the bifocal lens removed from the cradle.

It is noted that an alternative step in the above process would include heating only the abutting edges of the lens halves rather than the entire lens halves. The entire lens halves could be heated to a temperature below the fusing temperature, then local application of heat to the abutting edges could bring those abutting edges up to fusing temperature. Thus, for example, the lens halves could be heated to about 1,200° F., then a quartz light, or a laser beam, could be focused onto the abutting edges to heat those edges to about 1,400° F. for a time sufficient to fuse those edges together.

The bifocal lens formed according to the preceding process comes out polished and finished on both the back and front surfaces and is easily and efficiently manufactured. Both halves of the lens are formed of the same type of glass, and thus many advantages are inherent therein.

As this invention may be embodied in several forms without departing from the spirit or essential characteristics thereof, the present embodiment is, therefore, illustrative and not restrictive, since the scope of the invention is defined by the appended claims rather than by the description preceding them, and all changes that fall within the metes and bounds of the claims or that form their functional as well as conjointly cooperative equivalents are, therefore, intended to be embraced by those claims.

I claim:

1. A method of forming an edge fused multifocal lens comprising the steps of:
   providing a plurality of lens blocks;

cutting each lens block into arcuate elongate lens portions each having a pair of longitudinal side edges, a pair of end edges, an inside face and an outside face;

grinding and polishing each lens portion to correct a vision defect;

grinding each of the longitudinal side edges of all of said lens portions so that all such longitudinal side edges are essentially planar and all of said longitudinal side edges are substantial duplicates of each other so that said longitudinal side edges will fit essentially perfectly flush when in abutting relationship;

interchanging and matching said ground and polished lens portions so that a plurality of vision defects can be corrected with a single matched set of lens portions;

precision matching said matched lens portions in edge abutting relationship with each other so that a longitudinal side edge of one lens portion flushly abuts a longitudinal side edge of another lens portion;

backgrinding said edge abutting lens portions so that all lens portions of said matched set have a common radius of curvature on the inner faces thereof;

placing said background edge abutting lens portions on a fusing jig and applying pressure to force said edge abutting lens portions together;

heating said background edge abutting lens portions to a predetermined fusing temperature for a predetermined fusing time to fuse said edge abutting, background lens portions together at said abutting longitudinal edges to form a bifocal lens; and reducing the predetermined fusing temperature to a predetermined annealing temperature for a predetermined annealing time to anneal the bifocal lens.

2. The method of forming a multifocal lens defined in claim 1 wherein all lens portions are of the same glass.

3. The method of forming a multifocal lens defined in claim 1 including the step of coating the fusing jig with an anti-friction agent prior to placing the background lens halves thereon.

4. The method of forming a multifocal lens defined in claim 1 wherein placing said lenses on a fusing jig includes a clamping step and said clamping step includes providing a swing arm lever engaging the fusing jig.

5. The method of forming a multifocal lens defined in claim 1 wherein the multifocal lens is a bifocal lens.

6. The method of forming a multifocal lens defined in claim 1 further including a step of orienting said lens portions with respect to each other so that any discontinuity between said lens portions at said abutting edges is evenly distributed over essentially the entire length of said edge abutting lens portions.

7. The method of forming a multifocal lens as defined in claim 1 wherein a plurality of lens portion longitudinal side edges are ground essentially simultaneously in said grinding step.

8. The method of forming a multifocal lens defined in claim 1 wherein said predetermined fusing time is about six minutes and said predetermined fusing temperature is about 1360° to 1400° F.

9. The method of forming a multifocal lens defined in claim 8 wherein said predetermined annealing time is about four hours and said predetermined annealing temperature is about 200° F. below said predetermined fusing temperature.

10. The method of forming a multifocal lens defined in claim 1 wherein said fusing step includes raising said edge abutting lens portions to a predetermined temperature which is below the fusing temperature of said lens portions, then raising only the abutting edges and the area immediately adjacent thereto to a temperature sufficient to fuse said lens portions together.

11. The method of forming a multifocal lens defined in claim 10 wherein said fusing step includes focusing a quartz light on said lens portion abutting edges.

12. The method of forming a multifocal lens defined in claim 10 wherein said fusing step includes focusing a laser beam on said lens portion abutting edges.

13. An edge-fused multifocal lens comprising:
a first lens portion which is ground and polished to correct a first vision defect;
a second lens portion which is ground and polished to correct a second vision defect;
each of said lens portions having longitudinal edges which are essentially planar, said longitudinal edges being ground so that the longitudinal edges of said first lens portion are essential duplicates of the longitudinal edges of any second lens portion and said longitudinal edges can be flushly fit and precision matched against each other;
said first and second lens portions being pressed together in edge abutting relationship with each other; and
said first and second lens portions being fused together at said abutting edges to form a single multifocal lens.

14. The multifocal lens of claim 13 wherein said first and second lens portions are formed of the same type of material.

15. The multifocal lens of claim 13 further including a step of orienting said lens portions with respect to each other so that any discontinuity between said lens portions at said abutting edges is evenly distributed over essentially the entire length of said edge abutting lens portions.

16. A method of forming an edge fused multifocal lens comprising the steps of:
providing a plurality of lens blocks;
cutting each lens block into arcuate elongate lens portions each having a pair of longitudinal side edges, a pair of end edges, an inside face and an outside face;
grinding and polishing each lens portion to correct a vision defect;
grinding each of the longitudinal side edges of all of said lens portions so that all such longitudinal side edges ae essentially planar and all of said longitudinal side edges are substantial duplicates of each other so that said longitudinal side edges will fit essentially perfectly flush when in abutting relationship;
interchanging and matching said ground and polished lens portions so that a plurality of vision defects can be corrected with a single matched set of lens portions;
precision matching said matched lens portions in edge abutting relationship with each other so that a longitudinal side edge of one lens portion flushly abuts a longitudinal side edge of another lens portion;
moving one lens portion with respect to the other lens portion so that any discontinuity between the radii of curvature of such lens portions is distributed along the abutting longitudinal side edges of said precision matched lens portions in a manner such that such discontinuity decreases essentially uniformly from said end edges to near the center of such matched lens portions;

backgrinding said edge abutting lens portions so that all lens portions of said matched set have a common radius of curvature on the inner faces thereof;

placing said background edge abutting lens portions on a fusing jig;

heating said background edge abutting lens portions to a predetermined fusing temperature for a predetermined fusing time to fuse said edge abutting, background lens portions together at said abutting longitudinal edges to form a bifocal lens; and reducing the predetermined fusing temperature to a predetermined annealing temperature for a predetermined annealing time to anneal the bifocal lens.

17. The method of forming a multifocal lens as defined in claim 16 wherein a plurality of lens portion longitudinal side edges are ground essentially simultaneously in said grinding step.

* * * * *